US010375457B2

United States Patent
Bender et al.

(10) Patent No.: US 10,375,457 B2
(45) Date of Patent: Aug. 6, 2019

(54) INTERPRETATION OF SUPPLEMENTAL SENSORS

(71) Applicant: International Business Machines Corporation, Armonk, NY (US)

(72) Inventors: Michael Bender, Rye Brook, NY (US); Rahul Gupta, Austin, TX (US); David B. Kumhyr, Austin, TX (US); Leucir Marin Junior, Cedar Park, TX (US); Arnaud A. Mathieu, Austin, TX (US); Maharaj Mukherjee, Poughkeepsie, NY (US); Michael P. Robertson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 15/423,001

(22) Filed: Feb. 2, 2017

(65) Prior Publication Data

US 2018/0220206 A1 Aug. 2, 2018

(51) Int. Cl.
*H04Q 9/00* (2006.01)
(52) U.S. Cl.
CPC ........... *H04Q 9/00* (2013.01); *G08C 2201/93* (2013.01); *H04Q 2209/25* (2013.01); *H04Q 2209/84* (2013.01)
(58) Field of Classification Search
CPC .................................................... H04Q 9/5066
USPC ....................................... 340/870.07, 539.17
See application file for complete search history.

(56) References Cited

U.S. PATENT DOCUMENTS

| | | | | |
|---|---|---|---|---|
| 7,834,754 B2 * | 11/2010 | Kulesz | .................. | G08B 21/12 340/3.1 |
| 7,952,474 B2 * | 5/2011 | Kang | .................. | G08B 29/183 340/506 |
| 8,624,729 B2 * | 1/2014 | Preden | .................... | H04Q 9/00 340/539.17 |
| 9,030,320 B2 * | 5/2015 | Reinpoldt | .......... | G08B 13/2494 340/517 |
| 9,262,915 B2 | 2/2016 | Clem et al. | | |
| 9,367,676 B2 | 6/2016 | Wilson | | |
| 2015/0134954 A1 * | 5/2015 | Walley | .................... | H04L 63/08 713/168 |
| 2016/0148509 A1 | 5/2016 | Fayfield et al. | | |

(Continued)

OTHER PUBLICATIONS

Anonymously; "Ubiquitous Sensor Modules for Field Applications"; http://ip.com/IPCOM/000235806D, Mar. 25, 2014, 5 pages.
(Continued)

*Primary Examiner* — Albert K Wong
(74) *Attorney, Agent, or Firm* — Reza Sarbakhsh; SVL IP Law Edell, Shapiro & Finnan, LLC

(57) ABSTRACT

A method, a computing system and a computer program product are provided for utilizing supplemental sensors to monitor conditions of an area employing a sensor network. One or more supplemental sensors that are external to the sensor network are detected in an area. The one or more supplemental sensors are added to the sensor network. Readings pertaining to the conditions of the area are retrieved from the detected one or more supplemental sensors and one or more first sensors included in the sensor network. The readings of the one or more supplemental sensors and the one or more first sensors are compared and a resulting condition of the area is determined based on the comparing.

20 Claims, 6 Drawing Sheets

(56) References Cited

U.S. PATENT DOCUMENTS

2016/0255420 A1* 9/2016 McCleland ............. H04W 4/70
340/870.07
2017/0289255 A1* 10/2017 Urquhart ................. H04L 67/12

OTHER PUBLICATIONS

Anonymously; "Routing Data in a Wireless Sensor Network"; http://ip.com/IPCOM/000198129D, Jul. 26, 2010, 26 pages.
Cega; "Sensing Impacts: Remote Monitoring Using Sensors"; Innovations for Poverty Action, Feb. 2016, 21 pages.
"Integrating IoT Sensor Technology into the Enterprise", Intel Corporation, IT@INTEL, White Paper, Dec. 2015, pp. 1-15.
Diaz Pardo De Vera, et al., "A Ubiquitous Sensor Network Platform for Integrating Smart Devices into the Semantic Sensor Web", Sensors, v.14, Jun. 2014, pp. 10725-10752.

* cited by examiner

US 10,375,457 B2

INTERPRETATION OF SUPPLEMENTAL SENSORS

BACKGROUND

Present invention embodiments are related to systems, methods and computer program products for integrating supplemental sensors into a sensor network to augment the sensor network and more accurately discern conditions. In particular, the present invention embodiments periodically detect and integrate previously undetected supplemental sensors into the sensor network, read fixed and supplemental sensors of the sensor network, and when readings from one or more fixed sensors in an area vary from readings of one or more supplemental sensors in the area, then the readings are evaluated to determine a condition.

Existing sensor systems such as, for example, sensor systems on trains and buses in a mass transit system, employ a defined sensor network that provides information for operators to make inferences about how the mass transit system is operating or to evaluate the mass transit system's performance efficiency. When only one sensor in an area provides information for the area and the one sensor is inaccurately reporting a condition, it is difficult, if not impossible, to determine that the provided information is inaccurate.

SUMMARY

In a first aspect of the invention, a method is provided for utilizing supplemental sensors to monitor conditions of an area employing a sensor network. One or more supplemental sensors may be detected external of the sensor network within the area. The one or more detected supplemental sensors may be added to the sensor network. Readings may be retrieved pertaining to the conditions of the area from the sensor network, including the detected one or more supplemental sensors and one or more first sensors. A resulting condition of the area may be determined based on the comparing. In a second aspect of the invention, a computing system is provided for monitoring conditions of an area employing a sensor network. The computing system includes, among other things, at least one processor, a network interface to allow the computing system to communicate with devices of a sensor network, and at least one memory connected with the at least one processor. The at least one processor is configured to: detect one or more supplemental sensors external of the sensor network within the area; add the one or more detected supplemental sensors to the sensor network; retrieve readings pertaining to the conditions of the area from the sensor network including the detected one or more supplemental sensors and one or more first sensors; compare the readings of the detected one or more supplemental sensors and the one or more first sensors; and determine a resulting condition of the area based on the comparing.

In a third aspect of the invention, a computer program product is provided. The computer program product includes at least one computer readable storage medium having computer readable program code embodied therewith for execution on a computing device. The computer readable program code is configured to be executed by the computing device to: detect one or more supplemental sensors external of the sensor network within the area; add the one or more detected supplemental sensors to the sensor network; retrieve readings pertaining to the conditions of the area from the sensor network including the detected one or more supplemental sensors and one or more first sensors; compare the readings of the detected one or more supplemental sensors and the one or more first sensors; and determine a resulting condition of the area based on the comparing.

BRIEF DESCRIPTION OF THE DRAWINGS

Generally, like reference numerals in the various figures are utilized to designate like components.

DETAILED DESCRIPTION

Present invention embodiments include methods, systems and computer program products for periodically detecting supplemental sensors in an area, integrating the detected supplemental sensors into an existing sensor network including one or more fixed sensors, and reading the one or more fixed sensors and one or more supplemental sensors. When the readings of any of the one or more fixed sensors in an area vary from the readings of any of the one or more supplemental sensors in the area, present invention embodiments evaluate the readings to determine a condition.

Figure 1:
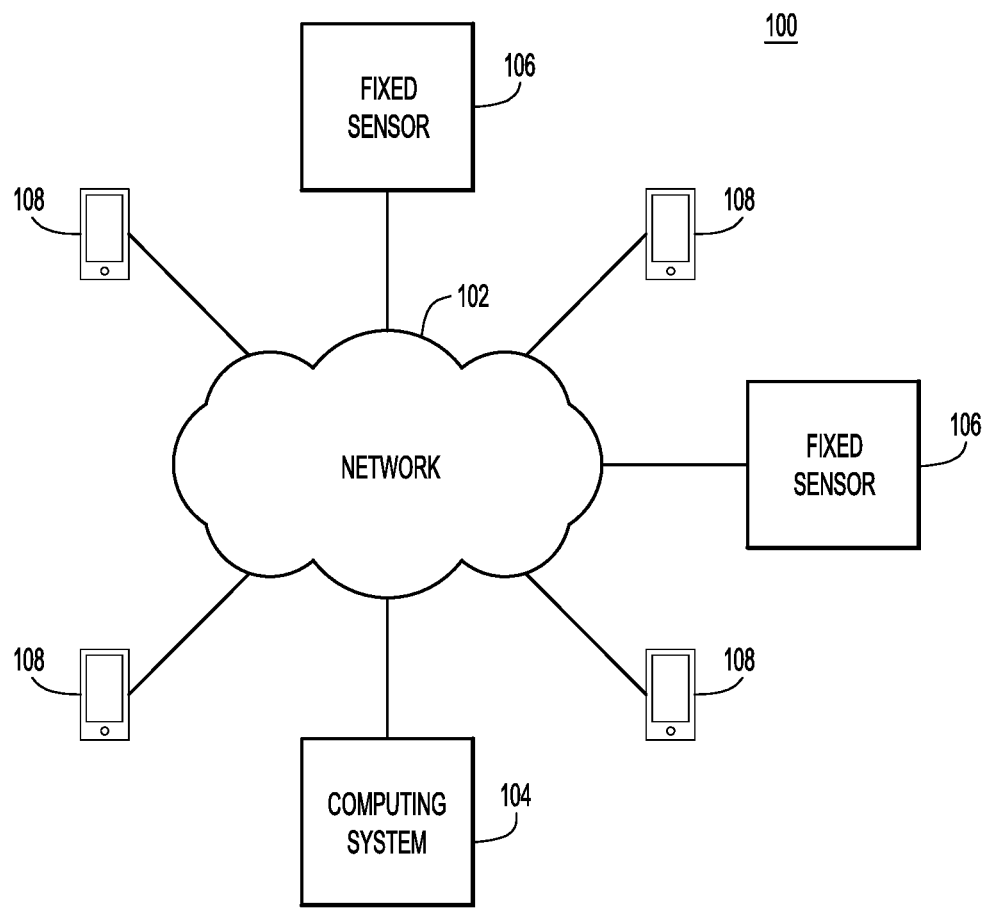
FIG. 1 illustrates an example environment for implementing various embodiments.

FIG. 1 shows an example environment 100 in which various embodiments may be implemented. The example environment may include a sensor network 102, a computing system 104, one or more fixed sensors 106 and one or more Internet of Things (IoT) devices, which may function as supplemental sensors 108 connected to network 102. Network 102 may include a local area network (LAN), a wide area network (WAN), a public switched data network (PSDN), the Internet, an intranet, other types of networks, or any combination of the above. Each of one or more fixed sensors 106 and one or more supplemental sensors 108 may communicate with computing system 104 or with other devices connected to sensor network 102. Supplemental sensors 108 may be any of a number of devices including, but not limited to, smartphones, tablets, laptop and notebook computers.

Figure 2:
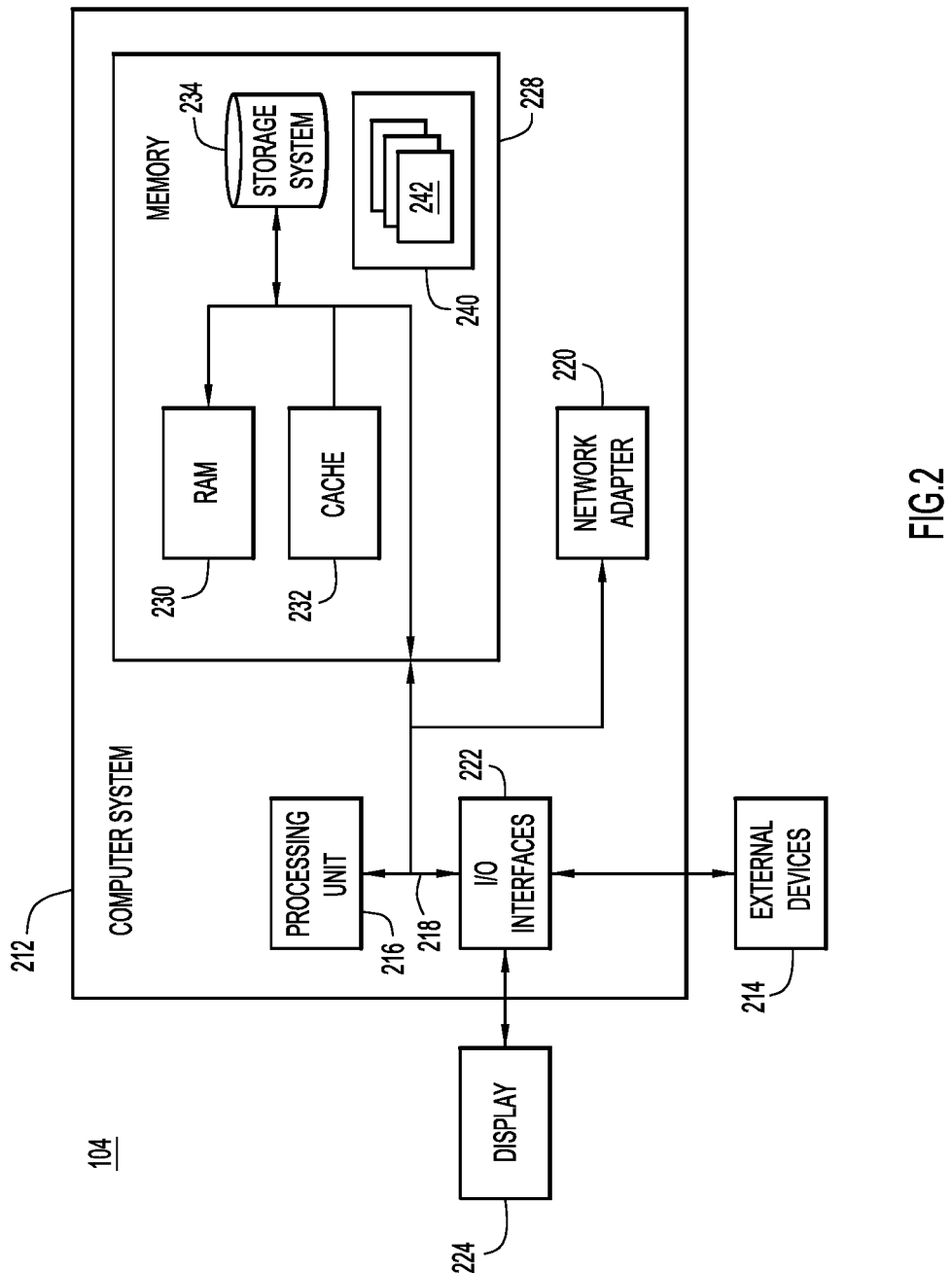
FIG. 2 is a functional block diagram of an example computing system for implementing embodiments of the invention.

An example computing system 104 in which embodiments of the invention may be implemented is shown in FIG. 2. FIG. 2 shows a functional block diagram of example computing system 104, which includes computer system 212. Computer system 212 is shown in a form of a general-purpose computing device. Components of computer system 212 may include, but are not limited to, one or more processors or processing units 216, a system memory 228, and a bus 218 that couples various system components including system memory 228 to one or more processors 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 212 typically includes a variety of computer system readable media. Such media may be any available media that is accessible by computer system 212, and includes both volatile and non-volatile media, removable and non-removable media.

System memory 228 can include computer system readable media in the form of volatile memory, such as random access memory (RAM) 230 and/or cache memory 232. Computer system 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, the one or more application programs, the other program modules, and the program data or some combination thereof, may include an implementation of a networking environment. Program modules 242 generally carry out the functions and/or methodologies of embodiments of the invention as described herein.

Computer system 212 may also communicate with one or more external devices 214 such as a keyboard, a pointing device, a display 224, etc.; one or more devices that enable a user to interact with computer system 212; and/or any devices (e.g., network card, modem, etc.) that enable computer system 212 to communicate with one or more other computing devices. Such communication can occur via Input/Output (I/O) interfaces 222. Still yet, computer system 212 can communicate with one or more networks such as a local area network (LAN), a general wide area network (WAN), and/or a public network (e.g., the Internet) via network adapter 220. As depicted, network adapter 220 communicates with the other components of computer system 212 via bus 218. It should be understood that, although not shown, other hardware and/or software components could be used in conjunction with computer system 212. Examples, include, but are not limited to: microcode, device drivers, redundant processing units, external disk drive arrays, RAID systems, tape drives, and data archival storage systems, etc.

Figure 3:
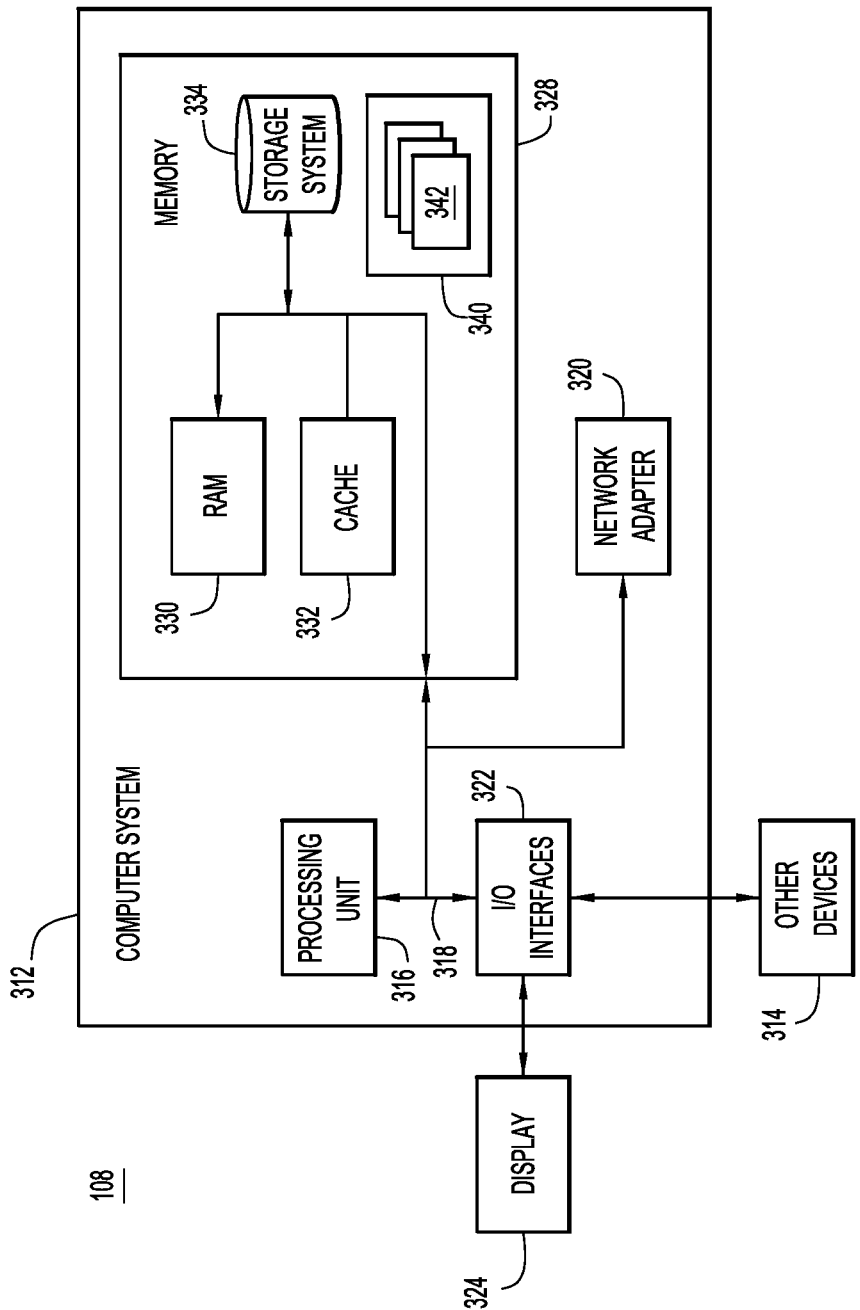
FIG. 3 illustrates a functional block diagram of an example supplemental sensor that may be used in various embodiments.

An example supplemental sensor 106 in which embodiments of the invention may be implemented is shown in FIG. 3. FIG. 3 shows a functional block diagram of example supplemental sensor 108, which in this example may be a smartphone, but could be other types of devices in other embodiments. Computer system 312 may include, but is not limited to, one or more processors or processing units 316, a system memory 328, and a bus 318 that couples various system components including system memory 328 to one or more processors 316.

Bus 318 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 312 typically includes a variety of computer system readable media. Such media may be any available media that is accessible by computer system 312, and includes both volatile and non-volatile media, removable and non-removable media.

System memory 328 can include computer system readable media in the form of volatile memory, such as random access memory (RAM) 330 and/or cache memory 332. Computer system 312 may further include other removable/non-removable, volatile/non-volatile computer system storage media. By way of example only, storage system 334 can be provided for reading from and writing to a non-removable, non-volatile media (not shown). Although not shown, a magnetic drive for reading from and writing to a removable, non-volatile magnetic medium (e.g., a "memory card") or other non-volatile magnetic medium can be provided. In such instances, each can be connected to bus 318 by one or more data media interfaces. As will be further depicted and described below, memory 328 may include at least one program module.

Program/utility 340, having at least one program module 342, may be stored in memory 328 by way of example, and not limitation, as well as an operating system, one or more application programs, other program modules, and program data. Each of the operating system, the one or more application programs, the other program modules, and the program data or some combination thereof, may include an implementation of a networking environment. The at least one program module 342 generally carries out the functions and/or methodologies of embodiments of the invention as described herein.

Computer system 312 may also communicate with one or more external devices 314 such as a keyboard, a touch screen, a display 324, etc.; one or more devices that enable a user to interact with computer system 312; and/or any devices (e.g., network card, etc.) that enable computer system 312 to communicate with one or more other computing devices. Such communication can occur via Input/Output (I/O) interfaces 322. Still yet, computer system 312 can communicate with one or more networks such as a local area network (LAN), a general wide area network (WAN), and/or a public network (e.g., the Internet) via network adapter 320. As depicted, network adapter 320 communicates with the other components of computer system 312 via bus 318. It should be understood that, although not shown, other hardware and/or software components could be used in conjunction with computer system 312.

Figure 4:
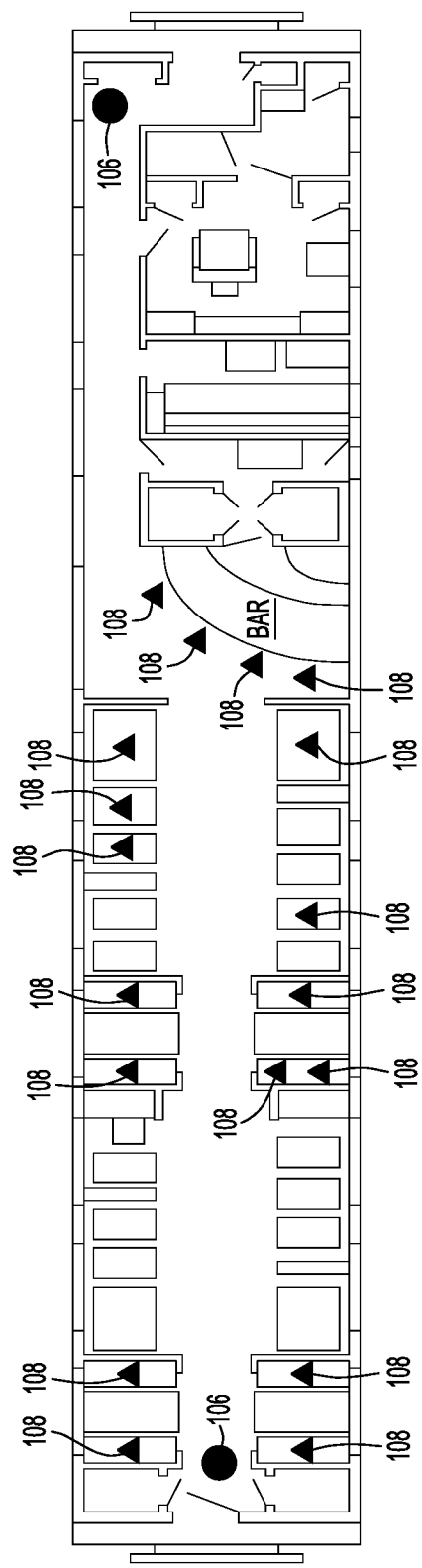
FIG. 4 is a diagram of an example lounge car of a train having a sensor network that includes fixed sensors and supplemental sensors.

FIG. 4 shows an example lounge car of a train. The lounge car has two fixed sensors 106 at both ends of the car and includes a number of supplemental sensors 108. Supplemental sensors 108 that are not already included in a sensor network with fixed sensors 106 may be added to the sensor network and assigned to an area that includes one of the two fixed sensors 106. Fixed sensors 106 and supplemental sensors 108 may be periodically read. When a variation in readings exist between a fixed sensor 106 and one or more supplemental sensors assigned to the area that includes fixed sensor 106, embodiments evaluate the readings to determine a condition, as explained in more detail below.

Figure 5:
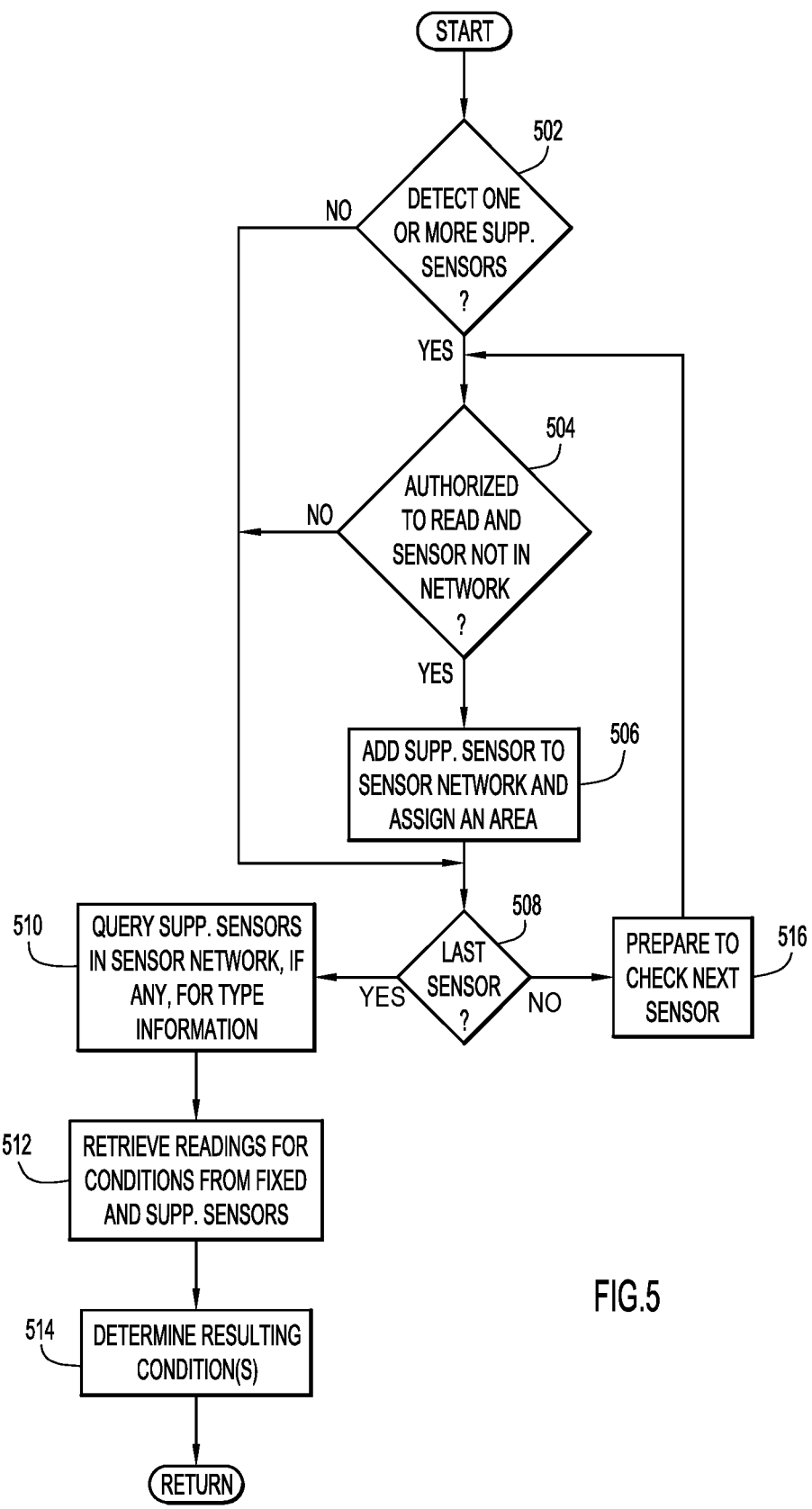
FIG. 5 is a flowchart of an example process for detecting and adding supplemental sensors to a sensor network, obtaining readings from the supplemental sensors and fixed sensors in the sensor network and for determining and reporting a resulting condition in various embodiments.

FIG. 5 is a flowchart that illustrates example processing in computing system 104 in some embodiments. The process may begin by detecting one or more supplemental sensors 108 that are not already included in a sensor network (102) (act 502). Computing system 104 may then determine whether it is authorized to read detected supplemental sensor 108, which is not already included in the sensor network (act 504).

In some embodiments, owners of supplemental sensors 108 may have previously been informed that by using a network in an area, including but not limited to a Wireless Fidelity (Wi-Fi) network, they are providing authorization for their supplemental sensors to be read. In other embodiments, a user may download an application to his/her supplemental sensor 108 for communicating with computing system 104 of sensor network 102. Before downloading the application, the user may be informed that he/she is providing authorization for supplemental sensor 108 to be read. In further embodiments, other methods may be employed for owners to provide authorization for reading their supplemental sensors 108.

If, during act 504, computing system 104 determined that it is authorized to read supplemental sensor 108, then computing system 104 may add supplemental sensor 108 to sensor network 102 and may assign an area to supplemental sensor 108 (act 506).

Computer system 104 may determine an area to assign to supplemental sensor 108 based on signal strength information regarding a signal detected from supplemental sensor 108. Generally, detected supplemental sensors 108 may be assigned to an area that includes a fixed sensor 106 closest to detected supplemental sensor 108. In other embodiments, other methods may be employed to assign an area to supplemental sensor 108.

Computing system 104 may then determine whether a last detected supplemental sensor, which computing system 104 is authorized to read, has been added to sensor network 102 (act 508). If, during act 508, computing system 104 determined that the last detected supplemental sensor 108, which computing system 104 is authorized to read, has been added to sensor network 102, then computing system 104 may query any supplemental sensors 108, which are newly added to sensor network 102, for type information (act 510). The type information provides an indication of a type of sensor data which may be obtained from a corresponding supplemental sensor 108. The different types of sensor data may include, but not be limited to, temperature data, humidity data, location data, orientation data and movement data.

Computing system 104 may then retrieve readings, according to corresponding type information, for conditions from supplemental sensors 108 included in sensor network 102 and from one or more fixed sensors 106 of sensor network 102 (act 512). Based on the readings, computing system 104 may determine resulting conditions in areas that include at least one fixed sensor 106 and one or more supplemental sensors 108 (act 514).

If, during act 508, computing system 104 determines that the last newly detected supplemental sensor 108 was not yet added to sensor network 102, then computing system 104 may prepare to check whether a next newly detected supplemental sensor 108 has been authorized for the computing system 104 to read (act 516). Computing system 104 may then repeat acts 504-508.

In various embodiments, when signals from a supplemental sensor 108 in sensor network 102 have not been received for a predetermined period of time such as, for example, 15 minutes, 30 minutes for another period of time, supplemental sensor 108 may be removed from sensor network 102.

Figure 6:
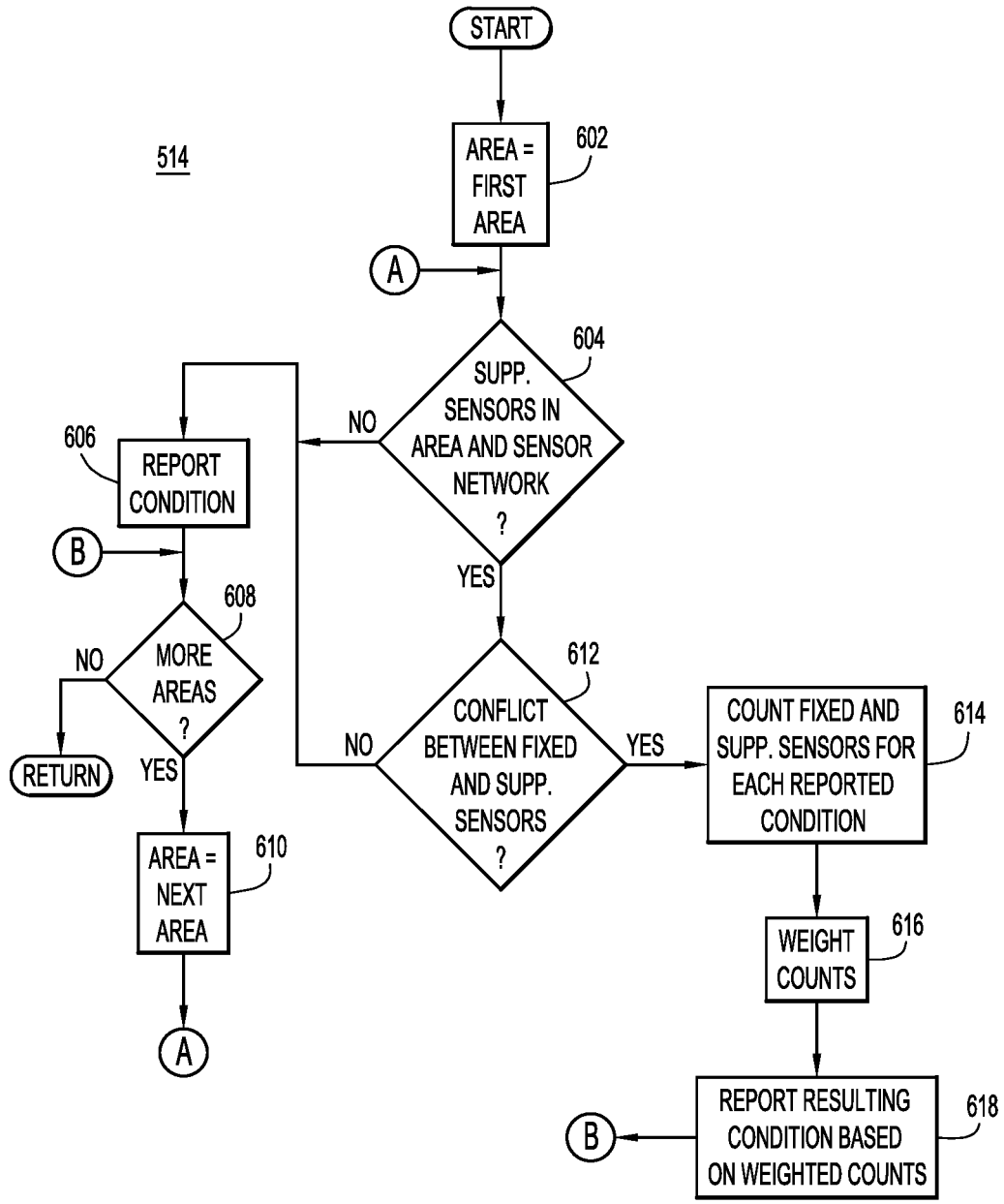
FIG. 6 is a flowchart of an example process for performing act 514 of FIG. 5 in various embodiments.

FIG. 6 is a flowchart that illustrates example processing with respect to act 514 of FIG. 5. The process may begin with preparing to process collected sensor information from a first area of sensor network 102 (act 602). A determination may be made regarding whether any supplemental sensors in sensor network 102 are assigned to the area (act 604).

If, during act 604, a determination is made that no supplemental sensors in sensor network 102 are assigned to the area, then a condition as indicated by fixed sensor 106 assigned to the area may be reported to computing system 104 (act 606). Next, a determination may be made regarding whether there are any additional areas from which collected sensor information may be processed (act 608). If no additional areas exist, then the process may be completed. Otherwise, preparation for processing collected sensor information from a next area may be performed (act 610) and act 604 may again be performed.

If, during act 604, a determination is made that one or more supplemental sensors 108 in sensor network 102 are assigned to the area, then a determination may be made regarding whether one or more supplemental sensors 108 are reporting a condition that conflicts with a condition reported by fixed sensor 106 assigned to the area (act 612). If the condition reported by fixed sensor 106 is determined not to conflict with the condition reported by one or more supplemental sensors 108 assigned to the area, then act 606 and 608 may again be performed.

If, during act 612 a determination is made that the condition reported by fixed sensor 106 conflicts with the condition reported by one or more supplemental sensors 108 assigned to the area, then for each reported condition a number of fixed sensors 106 and a number of supplemental sensors 108 reporting each condition may be determined (act 614). Next, the counts may be weighted (act 616) and the resulting condition reported based on weighted counts (act 618). For example, in an embodiment, fixed sensors 106 may be considered to be more reliable than supplemental sensors 108 because fixed sensors 106 may be periodically inspected to determine whether each fixed sensor 106 operates correctly, while supplemental sensors 108 may belong to multiple third parties with no information known regarding whether each supplemental sensor 108 is operating correctly. In such an embodiment, conditions reported by fixed sensors 106 may be given more weight than conditions reported by supplemental sensors 108. Thus, for example, each supplemental sensor 108 may be assigned a weight of 1, while each fixed sensor 106 may be assigned a weight of 1.3. Therefore, in this embodiment, if one supplemental sensor 108 and one fixed sensor 106 report conflicting conditions, a weighted count for supplemental sensor 108 may be 1, while a weighted count for fixed sensor 106 may be 1.3 and the conflicting condition may be resolved according to the condition reported by fixed sensor 106. Conditions reported by supplemental sensor 108, reporting the conflicting condition, may then be discarded. In other embodiments, different weights may be assigned to fixed sensors 106 and supplemental sensors 108.

In some embodiments, when all supplemental sensors 108 assigned to an area suddenly stop reporting conditions, while fixed sensor 106 assigned to the area continues to report conditions, or vice versa, supplemental sensors 108 may be considered to be reporting a condition that conflicts with a condition reported by fixed sensor 106. Such a condition may occur, for example, when fixed sensor 106 and supplemental sensors 108 are assigned to an area below deck on a ship. If the area becomes flooded, supplemental sensors 106 assigned to the area may suddenly stop reporting and false reports from a defective fixed sensor 106 may continue to be reported.

The environment of the present invention embodiments may include any number of computers or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, etc.). These systems may include any types of monitors and input devices (e.g., keyboard, mouse, voice recognition, etc.) to enter and/or view information.

It is to be understood that the software of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and may communicate via any suitable communications medium (e.g., LAN, WAN, Intranet, Internet, hardwired, modem connection, wireless, etc.). For example, the functions of the present invention embodiments may be distributed in any manner among the various systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to a server and/or client systems. The database systems and/or storage structures may be remote from or local to the computer or other processing systems, and may store any desired data.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

We claim:

1. A method of utilizing supplemental sensors to monitor conditions of a plurality of areas employing a sensor network, the method comprising:
   detecting, by a computer system, one or more supplemental sensors external to the sensor network, the sensor network including a plurality of fixed sensors;
   adding to the sensor network, by the computer system, only each respective supplemental sensor of the one or more detected supplemental sensors that a corresponding user authorized to be read by downloading an application to the respective supplemental sensor;
   assigning to a respective area, by the computer system, the each respective supplemental sensor added to the sensor network, the each respective supplemental sensor being assigned to the respective area including a closest fixed sensor of the plurality of fixed sensors;
   retrieving, by the computer system, readings pertaining to the conditions of each of the plurality of areas from the sensor network including the each respective supplemental sensor added to the sensor network and the plurality of fixed sensors; and
   for each respective area, performing, by the computer system:
      comparing the readings of the each respective supplemental sensor assigned to the respective area with one or more fixed sensors included in the respective area, and
      determining a resulting condition of the respective area based on the comparing.

2. The method of claim 1, further comprising:
   determining a respective type of the each supplemental sensor added to the sensor network; and
   querying the each supplemental sensor for readings in accordance with the respective determined type.

3. The method of claim 1, wherein one or more of the each respective supplemental sensor added to the sensor network include a sensor of an Internet of Things device.

4. The method of claim 1, wherein the determining a resulting condition further comprises:
   overriding a condition indicated by the sensor network in response to a variance in the readings between the one or more supplemental sensors assigned to one of the respective areas and the one or more fixed sensors included in the one of the respective areas.

5. The method of claim 4, wherein the determining a resulting condition further comprises:
   determining a first number of sensors in the one of the respective areas reporting a first condition and a second number of sensors in the one of the respective areas reporting a second condition; and
   determining the resulting condition based on which of the first number and the second number is a higher number.

6. The method of claim 5, wherein the plurality of fixed sensors are weighted differently than the each respective supplemental sensor when performing the determining of a first number of sensors and a second number of sensors.

7. A computing system for monitoring conditions of a plurality of areas employing a sensor network, the computing system comprising:
   at least one processor;
   a network interface to allow the computing system to communicate with devices of a sensor network; and
   at least one memory connected with the at least one processor, wherein the at least one processor is configured to:
      detect one or more supplemental sensors external to the sensor network, the sensor network including a plurality of fixed sensors;
      add to the sensor network only each respective supplemental sensor of the one or more detected supplemental sensors that a corresponding user authorized to be read by downloading an application to the respective supplemental sensor;
      assign to a respective area the each respective supplemental sensor added to the sensor network, the each respective supplemental sensor being assigned to the respective area including a closest fixed sensor of the plurality of fixed sensors;
      retrieve readings pertaining to the conditions of each of the plurality of areas from the sensor network including the each respective supplemental sensor added to the sensor network and the plurality of fixed sensors,
      for each respective area:
         compare the readings of the each respective supplemental sensor assigned to the respective area with one or more fixed sensors included in the respective area, and
         determine a resulting condition of the respective area based on the comparing.

8. The computer system of claim 7, wherein the at least one processor is further configured to:
   determine a respective type of the each supplemental sensor added to the sensor network; and
   query the each supplemental sensor for readings in accordance with the respective determined type.

9. The computing system of claim 7, wherein one or more of the each respective supplemental sensor added to the sensor network include a sensor of an Internet of Things device.

10. The computing system of claim 7, wherein the at least one processor being configured to determine a resulting condition further comprises the at least one processor being configured to:
    override a condition indicated by the sensor network in response to a variance in the readings between the one or more supplemental sensors assigned to one of the respective areas and the one or more fixed sensors included in the one of the respective areas.

11. The computing system of claim 7, wherein the at least one processor being configured to determine a resulting condition further comprises the at least one processor being configured to:
    determine a first number of sensors in the respective area reporting a first condition and a second number of sensors in the respective area reporting a second condition; and
    determine the resulting condition based on which of the first number and the second number is a higher number.

12. The computing system of claim 11, wherein the plurality of fixed sensors are weighted differently than the each respective supplemental sensor when performing the determining of a first number of sensors and a second number of sensors.

13. A computer program product comprising:
    at least one computer readable storage medium having computer readable program code embodied therewith for execution on a computing device, the computer readable program code being configured to be executed by the computing device to:
       detect one or more supplemental sensors external to a sensor network, the sensor network including a plurality of fixed sensors;

add to the sensor network only each respective supplemental sensor of the one or more detected supplemental sensors that a corresponding user authorized to be read by downloading an application to the respective supplemental sensor;

assign to a respective area of a plurality of areas the each respective supplemental sensor added to the sensor network, the each respective supplemental sensor being assigned to the respective area including a closest fixed sensor of the plurality of fixed sensors;

retrieve readings pertaining to the conditions of each of the plurality of areas from the sensor network including the each respective supplemental sensor added to the sensor network and the plurality of fixed sensors;

for each respective area:
  compare the readings of the each respective supplemental sensor assigned to the respective area with one or more fixed sensors included in the respective area, and
  determine a resulting condition of the respective area based on the comparing.

14. The computer program product of claim 13, wherein the computer readable program code is further configured to:
determine a respective type of the each supplemental sensor added to the sensor network; and
query the each supplemental sensor for readings in accordance with the respective determined type.

15. The computer program product of claim 13, wherein one or more of the each respective supplemental sensor added to the sensor network include a sensor of an Internet of Things device.

16. The computer program product of claim 13, wherein the computer readable program code being configured to determine a resulting condition further comprises computer readable program code being configured to:
override a condition indicated by the sensor network in response to a variance in the readings between the one or more supplemental sensors assigned to one of the respective areas and the one or more fixed sensors included in the one of the respective areas.

17. The computer program product of claim 13, wherein the computer readable code being configured to determine a resulting condition further comprises the computer readable code being configured to:
determine a first number of sensors in the respective area reporting a first condition and a second number of sensors in the respective area reporting a second condition; and
determine the resulting condition based on which of the first number and the second number is a higher number, wherein
the plurality of fixed sensors are weighted differently than the each respective supplemental sensor when performing the determining of a first number of sensors and a second number of sensors.

18. The method of claim 1, wherein:
the computer system determines a closest fixed sensor to the each respective supplemental sensor based on signal strength information regarding a signal detected from the each respective supplemental sensor.

19. The computer system of claim 7, wherein the at least one processor is further configured to:
determine a closest fixed sensor to the each respective supplemental sensor based on signal strength information regarding a signal detected from the each respective supplemental sensor.

20. The computer program product of claim 13, wherein the computer readable program code is further configured to:
determine a closest fixed sensor to the each respective supplemental sensor based on signal strength information regarding a signal detected from the each respective supplemental sensor.

* * * * *